United States Patent [19]
Engdahl

[11] 3,893,678
[45] July 8, 1975

[54] AUXILIARY FUEL TANK

[76] Inventor: Victor E. Engdahl, 28 W. Lewis, Phoenix, Ariz. 85003

[22] Filed: Mar. 27, 1974

[21] Appl. No.: 455,356

[52] U.S. Cl. ............ 280/5 A; 137/572; 224/42.42 R
[51] Int. Cl. ............................................. B60p 3/22
[58] Field of Search ...... 280/5 R, 5 A; 224/42.42 R, 224/42.41, 42.46 R; 220/5 A, 1 J; 137/571, 572, 574

[56] References Cited
UNITED STATES PATENTS

| | | | |
|---|---|---|---|
| 2,095,875 | 10/1937 | Johnson | 137/571 X |
| 3,207,203 | 9/1965 | Mack | 137/574 |
| 3,512,795 | 5/1970 | Naeve | 280/5 A |

FOREIGN PATENTS OR APPLICATIONS

| | | | |
|---|---|---|---|
| 402,401 | 3/1943 | Italy | 220/1 J |
| 1,440,675 | 12/1966 | France | 280/5 A |

*Primary Examiner*—Leo Friaglia
*Assistant Examiner*—R. Schrecengost
*Attorney, Agent, or Firm*—Don J. Flickinger

[57] ABSTRACT

A fluid-tight tank, shaped and sized to be received within the spare tire receptacle of a motor vehicle, is detachably secured by fastening means which engage the normal spare tire retaining anchor. The tank includes a filler neck and cap therefor and is vented to the atmosphere for pressure relief. A valve provides for selective communication between the fuel pump and either the auxiliary tank or the normal fuel tank.

1 Claim, 6 Drawing Figures

PATENTED JUL 8 1975 3,893,678

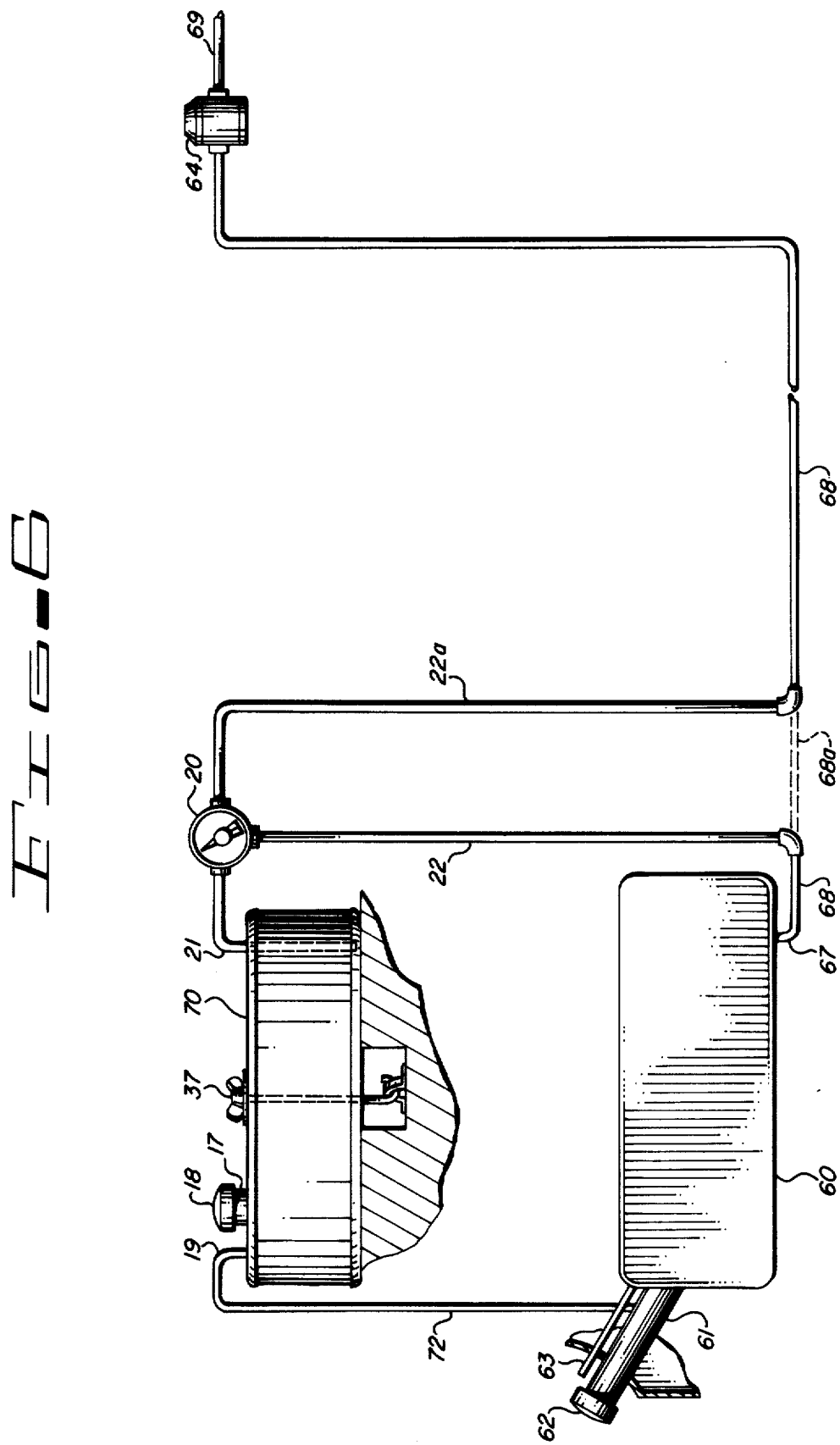

AUXILIARY FUEL TANK

This invention relates to motor vehicle accessories.

In a further aspect, the invention relates to auxiliary fuel tanks for use with motor vehicles.

More particularly, the instant invention concerns an auxiliary fuel tank adapted to be detachably received within the spare tire receptacle of a motor vehicle and integrated into the normal fuel supply system thereof.

Providing a motor vehicle with an auxiliary fuel supply to supplement the original equipment fuel tank is an established practice. The reasons for a supplemental fuel supply are numerous. Frequent travelers carry an auxiliary fuel tank to increase the driving range between stops and to insure that fuel can be purchased selectively in more economical locales. Ranchers, campers, adventurers, and others who trek through remote areas for extended durations, generally carry additional fuel to limit re-fueling trips. Others, though having no immediate need, simply take comfort in knowing that extra fuel is available in case of emergency. Still, when fuel is in short supply as during times of local or national emergency, most persons are desirous of having an auxiliary fuel supply as a general safeguard.

The prior art is replete with solutions for carrying additional fuel aboard a motor vehicle. The most elaborate and expensive scheme involves custom-made auxiliary tanks. The safety and efficiency of a custom tank is directly related to the sufficiency and competency of the design and installation. To escape the substantial financial investment of a custom installation, fuel is frequently carried in large containers, such as the familiar "jerry can", which are secured to the exterior of the vehicle. In addition to being unsightly and susceptible to loss or theft, such containers are extremely vulnerable to accidents. Then, too, the fuel must be transferred to the fuel tank -- an impossible task for the aged, infirm or frail. Small containers which are easily handled carried within the vehicle, either in the passenger compartment or in the trunk, pose an immediate hazard. If unvented, pressure builds within the container; if vented, fumes accumulate within the vehicle. In either case, a spark generated within the vehicle or a minor accident is sufficient to explode the fuel.

It would be highly advantageous, therefore, to provide an economical, safe and efficient auxiliary fuel tank for use in motor vehicles.

Accordingly, it is a principal object of the present invention to provide an auxiliary fuel tank which is safely and conveniently carried within the spare tire receptacle of a motor vehicle.

Another object of the present invention is to provide an auxiliary fuel tank which is adapted to be integrated into the existing fuel system of the motor vehicle.

Still another object of the present invention is the provision of an auxiliary fuel tank and installation accessories therefor which can be supplied in kit form to be installed by the vehicle owner without the necessity for special tools or skills.

Yet another object of the present invention is to provide an auxiliary fuel tank which is detachably secured within the spare tire receptacle and readily transferrable to a subsequent vehicle by the vehicle owner.

Yet still another object of the present invention is to provide an auxiliary fuel tank which is adequately vented to the atmosphere for the relief of pressure and fuel fumes from the tank.

A further object of the present invention is to provide an auxiliary fuel tank having mounting accessories associated therewith, whereby fuel may be selectively drawn from the original equipment fuel tank or the auxiliary tank.

A still further object of the present invention is to provide an auxiliary fuel tank of the above type which, while being durably and adequately constructed, is relatively economical to manufacture.

Briefly, to achieve the desired objectives of the present invention in accordance with a preferred embodiment thereof, first provided is a fluid-tight tank shaped and sized to be received within the spare tire receptacle of a motor vehicle and detachably secured to the normal spare tire retaining anchor. A filler neck extending from the tank and a cap sealingly engageable with the filler neck accommodates filling the tank with fuel. The tank is vented for atmospheric relief of fuel vapors and pressure within the tank. The tank includes a fluid pick-up through which fuel is drawn by the fuel pump of the vehicle.

In an alternate and more sophisticated embodiment, the auxiliary fuel tank as described above is included into an auxiliary fuel tank system which is integrated into the normal fuel system of the vehicle. The system further includes a valve placed in the fuel line of the vehicle in series between the normal fuel tank and the fuel pump and communicating with the fluid pick-up associated with the auxiliary fuel tank. The valve provides for operatively and selectively connecting either the normal fuel tank or the auxiliary fuel tank with the fuel pump.

The foregoing and further and more specific objects and advantages of the present invention will become readily apparent to those skilled in the art from the following detailed description of the preferred embodiments thereof, taken in conjunction with the drawings, in which:

FIG. 6 is a schematic diagram of an auxiliary fuel tank system according to the present invention which has been integrated into the normal fuel system of a motor vehicle.

Figure 1:
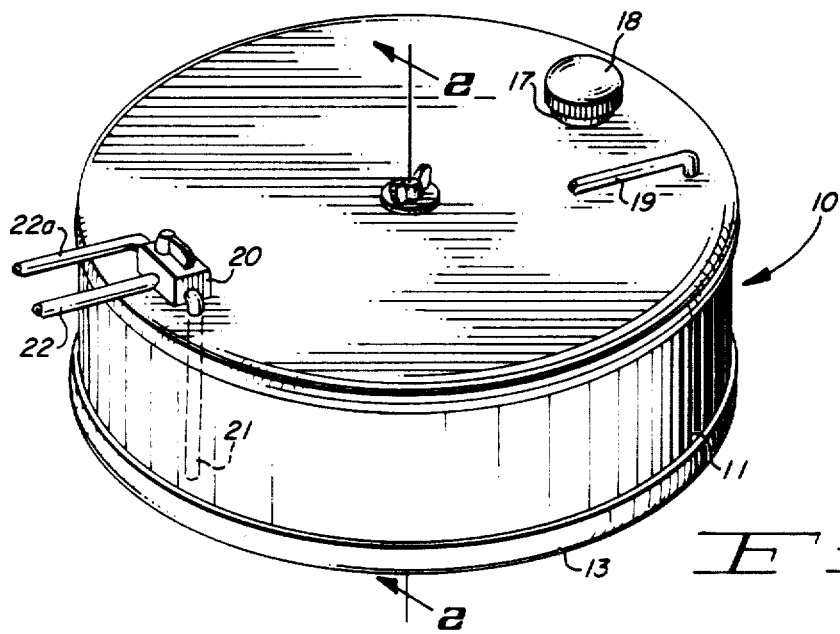
FIG. 1 is a perspective view of an auxiliary fuel tank constructed in accordance with the teachings of the present invention.
Figure 2:
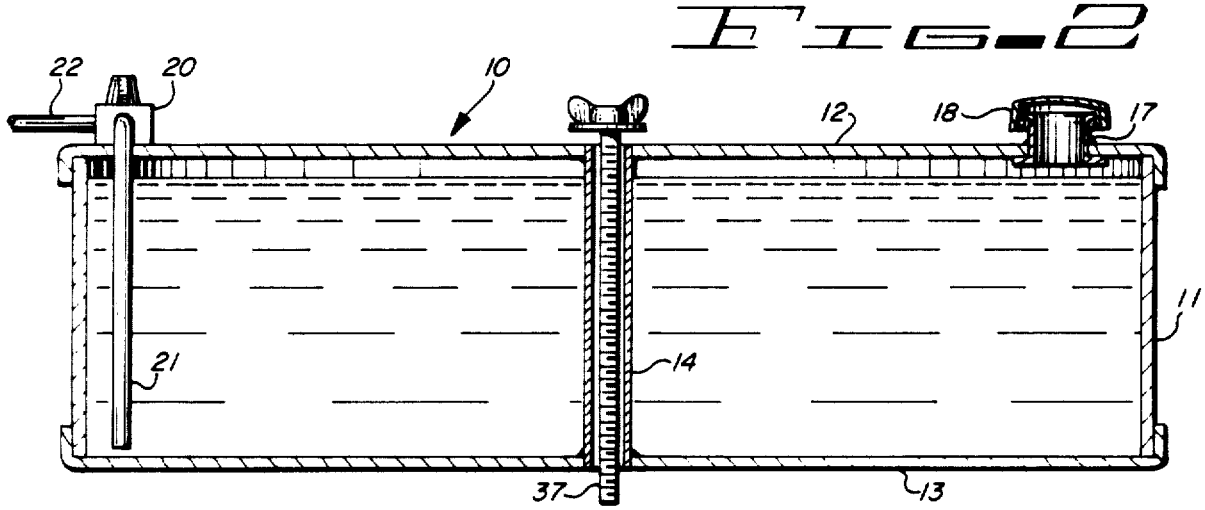
FIG. 2 is a vertical sectional view taken along the line 2—2 of FIG. 1, further illustrating the construction thereof.

Turning now to the drawings, in which the same reference numerals indicate corresponding elements throughout the several views, attention is first directed to FIGS. 1 and 2, which show an auxiliary fuel tank constructed in accordance with the teachings of the present invention having a fluid-tight tank 10 fabricated from a cylindrical side wall 11 having upper and lower spaced end walls 12 and 13, respectively, sealingly engaged with the cylindrical side wall 11. A tube 14 extends through the tank 10 between the upper end wall 12 and the lower end wall 13 and is sealingly engaged therewith. Fuel is introduced into the tank through a filler neck 17 extending from the upper end wall 12. A cap 18 engages the free end of the filler neck 17 and forms a fluid-tight seal therewith. A tube 19 vents the tank 10 to the atmosphere for relief of fuel vapors and pressure buildup within the tank. A selective valve 20 communicates with the fluid pick-up 21 associated with the fluid-tight tank 10 and the normal or original equipment fuel line of the automobile. For purposes of illustration, the normal fuel line referenced from the selective valve 20 is considered to have a first branch 22 extending from the normal tank of the motor vehicle and a second branch 22a which communicates with the fuel pump. Preferably, the auxiliary fuel tank is a weldment with all components thereof secured in a fluid-tight arrangement, as can be expeditiously accomplished by the well-known production technique commonly referred to as "oven brazing." The integration of the auxiliary fuel tank into the standard fuel system of a conventional vehicle will be described in detail presently.

Figure 3:
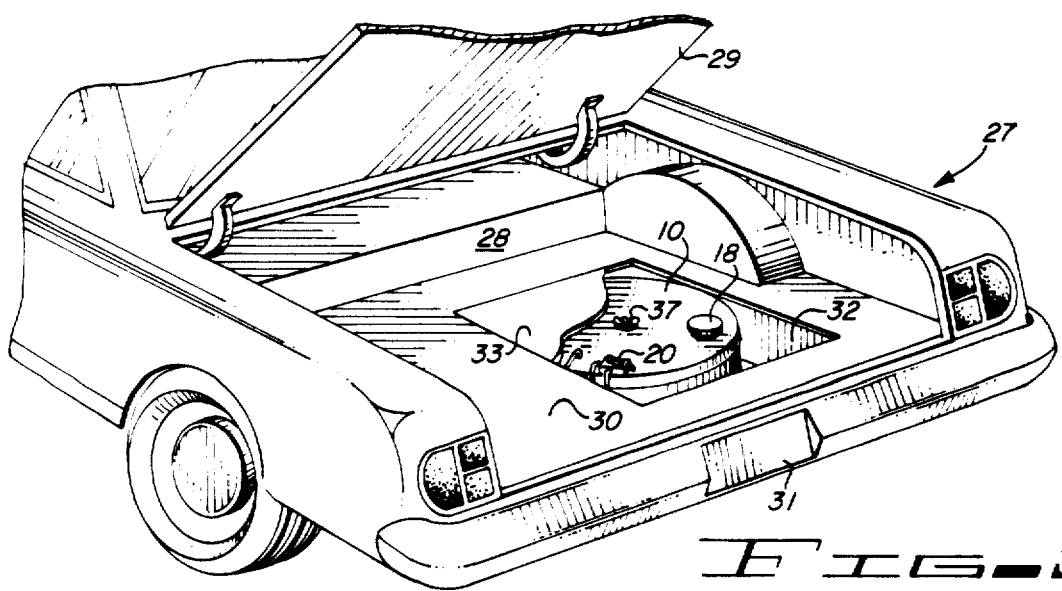
FIG. 3 is a partial perspective view of a motor vehicle, herein illustrated as a conventional passenger automobile, having an auxiliary fuel tank as illustrated in FIG. 1 connected thereto.

FIG. 3 illustrates a conventional automobile, generally designated by the reference character 27, having a luggage compartment 28 at the rear end thereof accessible through a hinged cover 29. It is widely accepted practice among automobile manufacturers to locate the standard equipment fuel tank under the floor 30 of the luggage compartment 28 with the filler neck thereof accessible under a hinged license plate, herein designated by the reference character 31. A receptacle 32 is formed into the floor 30 adjacent the fuel tank for normally receiving the spare tire. A panel 33 covers the receptacle 32 to form a continuation of the floor 30. As herein shown, the fluid-tight tank 10 has a diameter and thickness corresponding to the tire assembly for the vehicle. However, it is understood that the tank 10 may be variously shaped in accordance with the exact configuration of the spare tire receptacle 32. Although alternate means exist for retaining a spare tire within the spare tire receptacle, the means generally include an elongate rod which extends through either the hub opening or the lug opening of the tire rim. In one embodiment, the rod has a hook fashioned at one end thereof which engages an eye in the bottom of the receptacle and utilizes a wing nut on the other end thereof to bear against the tire. Alternately, the wings are integral with one end of the rod with the other end thereof threadedly engaging an anchor within the receptacle. FIG. 2 shows a rod 37 extending through the tube 14. It will be appreciated by those skilled in the art that the rod 37 is illustrative of the conventional spare tire retaining means as described and detachably retains the fluid-tight tank 10 within the receptacle 32 in accordance with methods well-known in the art.

Figure 4:
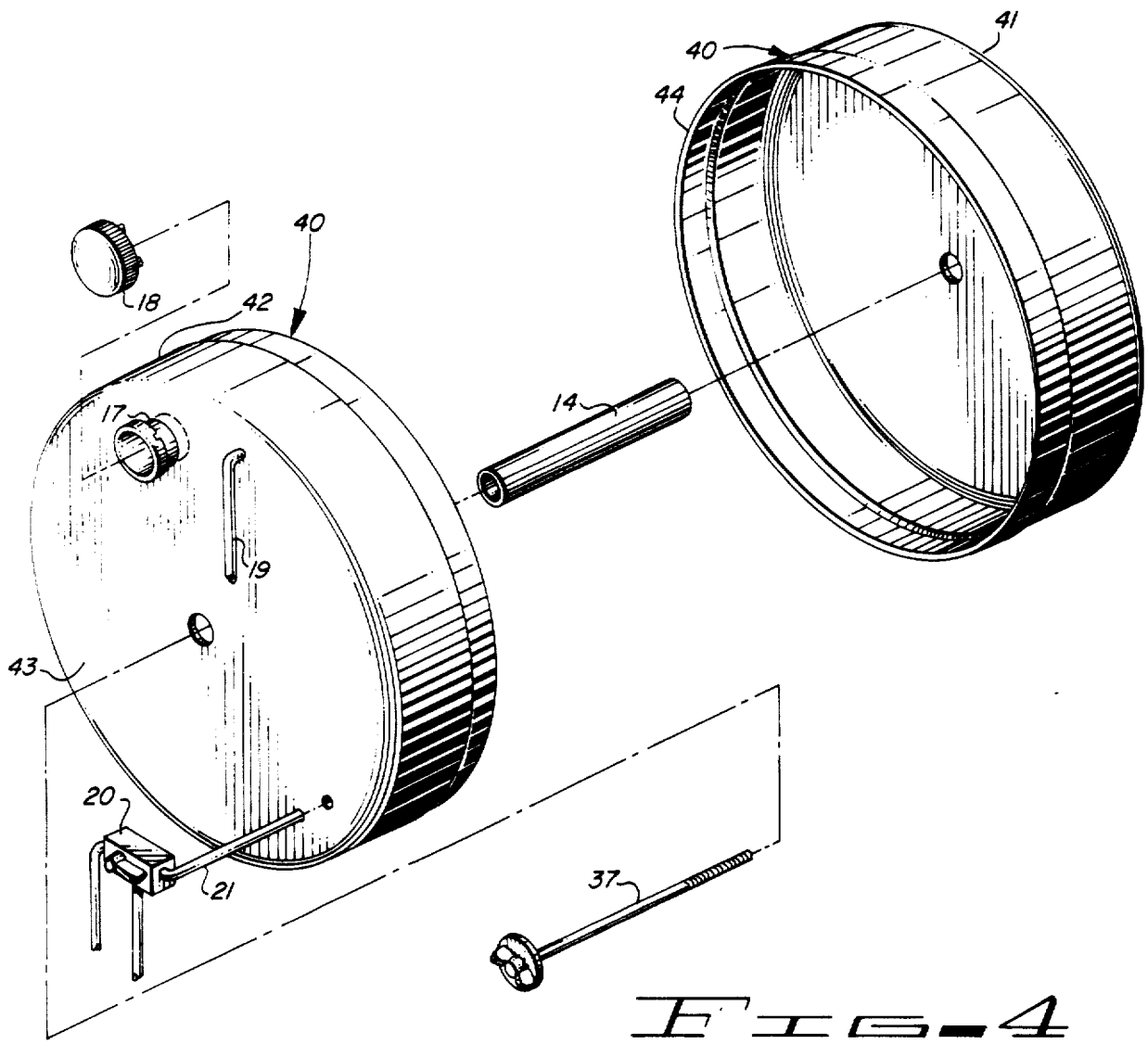
FIG. 4 shows an alternate embodiment of an auxiliary fuel tank constructed in accordance with the teachings of the present invention.

FIG. 4 illustrates an alternate embodiment of the auxiliary fuel tank of the present invention having an alternately constructed fluid-tight tank, generally designated by the reference character 40. The tank 40 is fabricated from pre-shaped halves 41 and 42, each half 41 and 42 having an end wall segment 43 with an integral cylindrical flange portion 44. Preferably, the edges of the flange portions 44 are abutted and welded in accordance with well-known fabrication techniques. The other elements associated with the fluid-tight tank 40 are identical to those hereinbefore described in connection with the fluid-tight tank 10. These elements include the tube 14, filler neck 17, cap 18, vent 19, selective valve 20 and fluid pick-up 21.

Figure 5:
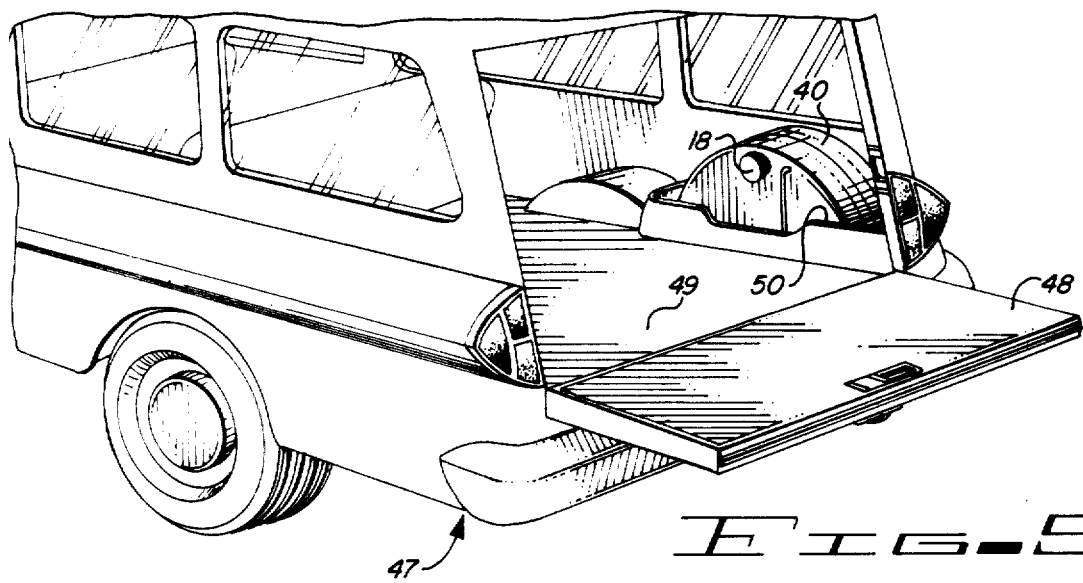
FIG. 5 is a partial perspective view of a motor vehicle, herein illustrated as a station wagon, having the auxiliary fuel tank of FIG. 4 received within the spare tire receptacle thereof.

FIG. 5 illustrates a conventional station wagon 47 having a rear hinged access hatch 48 and an interior floor 49. The station wagon 47, as herein illustrated, has a spare tire receptacle 50 located along the side of the vehicle and retaining the spare tire in the upright position. It is conventional practice to provide station wagons with spare tire receptacles, as illustrated in FIG. 5, and also as illustrated in FIG. 3. It is noted that the auxiliary fuel tank of the instant invention without modification thereof is suitable for either type of spare tire receptacle.

FIG. 6 shows an auxiliary fuel tank system according to the instant invention as it would appear diagramatically when integrated into the normal fuel system of a motor vehicle. The normal, or standard equipment, fuel system includes a fuel tank 60 which is filled through a filler neck 61 having a cap 62 associated therewith. The tank is vented to the atmosphere through tube 63. Fuel pump 64 draws fuel from the tank 60 through fluid pick-up 67 and fuel line 68. The fuel pump 64 discharges the fuel through conduit 69 to be received by the engine. The fluid-tight tank 70, which is representative of the fluid-tight tank 10 as described in connection with FIG. 1 and the fluid-tight tank 40 as described in connection with FIG. 4, is detachably secured within the spare tire receptacle by fastening means 37 engaged with the normal spare tire anchor 71. The selective valve 20 is placed in the fuel line 68 in series between the fuel tank 60 and the fuel pump 64. Preferably, this is accomplished by removing a portion of the fuel line 68, as indicated by the dashed line segment 68a. Since the fuel line 68 is normally under the motor vehicle and the fluid-tight tank 70 is in the spare tire receptacle, usually within the luggage compartment, fuel line extensions 22 and 22a are used to communicate between the severed ends of the fuel line 68 and the selective valve 20. The vehicle operator, by simple manipulation of the valve 20, may operatively and selectively connect either the fuel tank 60 or the fluid-tight tank 70 with the fuel pump 64. The provision of a tube 72 extending between the vent 19 and the tube 63, although not necessary for adequate function of the auxiliary fuel tank system, completes the integration thereof with the normal fuel system of the motor vehicle.

Having fully disclosed and described the invention and the presently preferred embodiments thereof in such clear and concise terms as to enable those skilled in the art to understand and practice the same, the invention claimed is:

I claim:

1. For use in connection with a motor vehicle which includes
   a standard equipment fuel tank having filler means and vent means,
   a fuel pump for drawing fuel from said standard equipment fuel tank,
   a fuel line communicating between said standard equipment fuel tank and said fuel pump,
   a spare tire receptacle sized and shaped to receive a wheel and tire assembly for said vehicle, and an anchor within said receptacle for attaining retaining means for detachably securing said wheel and tire assembly, an auxiliary fuel tank system comprising:
a. a generally cylindrical fluid-tight tank having a pair of spaced end walls and sized and shaped to be received within said spare tire receptacle;
b. a tube extending through said auxiliary tank and sealingly engaged with each said end wall;
c. retaining means, extendable through said tube and engageable with said anchor, for detachably securing said auxiliary tank within said spare tire receptacle;
d. filler means associated with said auxiliary tank including
 i. a filler neck extending from one of said end walls proximate said side wall, and
 ii. a cap sealingly engageable with said filler neck;
e. a vent proximate said filler means for atmospheric relief of fuel vapors and pressure within said auxiliary tank and capable of connection to the vent means of said standard fuel tank;
f. fluid pick-up means extending into said auxiliary tank and spaced diametrically from said filler means for receiving fuel from said auxiliary tank, whereby said tank is operative when placed in either horizontal or vertical spare tire receptacles; and
g. a valve in said fuel line and communicating with said fluid pick-up means for operatively and selectively connecting either said standard equipment fuel tank or said auxiliary tank with said fuel pump.

* * * * *

UNITED STATES PATENT AND TRADEMARK OFFICE
CERTIFICATE OF CORRECTION

PATENT NO. : 3,893,678
DATED : July 8, 1975
INVENTOR(S) : Victor E. Engdahl

It is certified that error appears in the above-identified patent and that said Letters Patent are hereby corrected as shown below:

Column 5, line 1, should be corrected to read as follows:

an anchor within said receptacle for attaching retain-

Signed and Sealed this thirtieth Day of September 1975

[SEAL]

Attest:

RUTH C. MASON
Attesting Officer

C. MARSHALL DANN
Commissioner of Patents and Trademarks